Jan. 19, 1965  F. SAPHRA  3,166,244
REVERSIBLE ANALOG COMPUTERS
Filed June 21, 1962  3 Sheets-Sheet 2
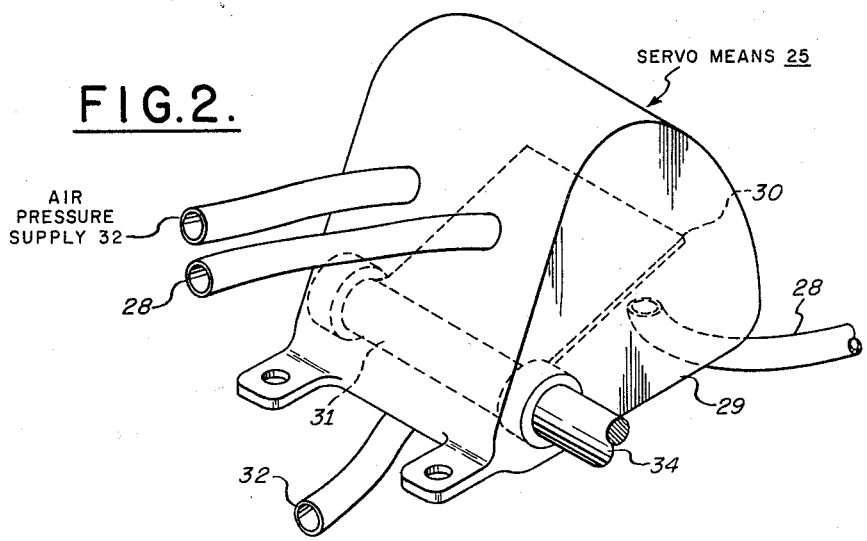
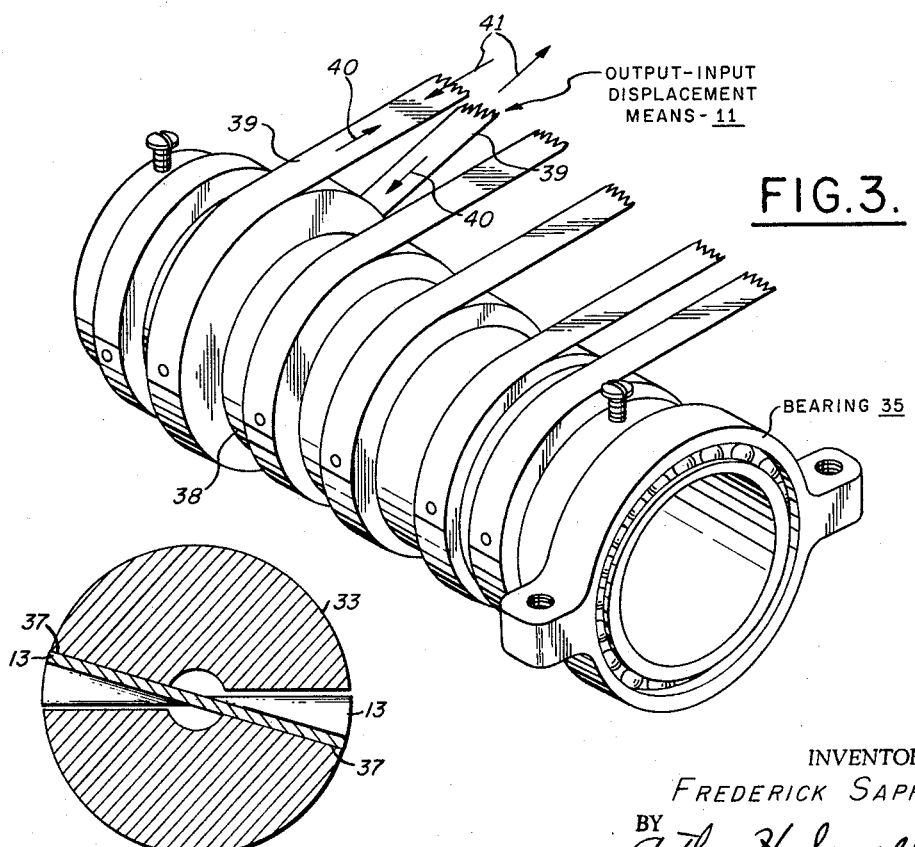
INVENTOR.
FREDERICK SAPHRA
BY
Arthur H. Serrell
ATTORNEY Jan. 19, 1965   F. SAPHRA   3,166,244
REVERSIBLE ANALOG COMPUTERS
Filed June 21, 1962   3 Sheets-Sheet 3

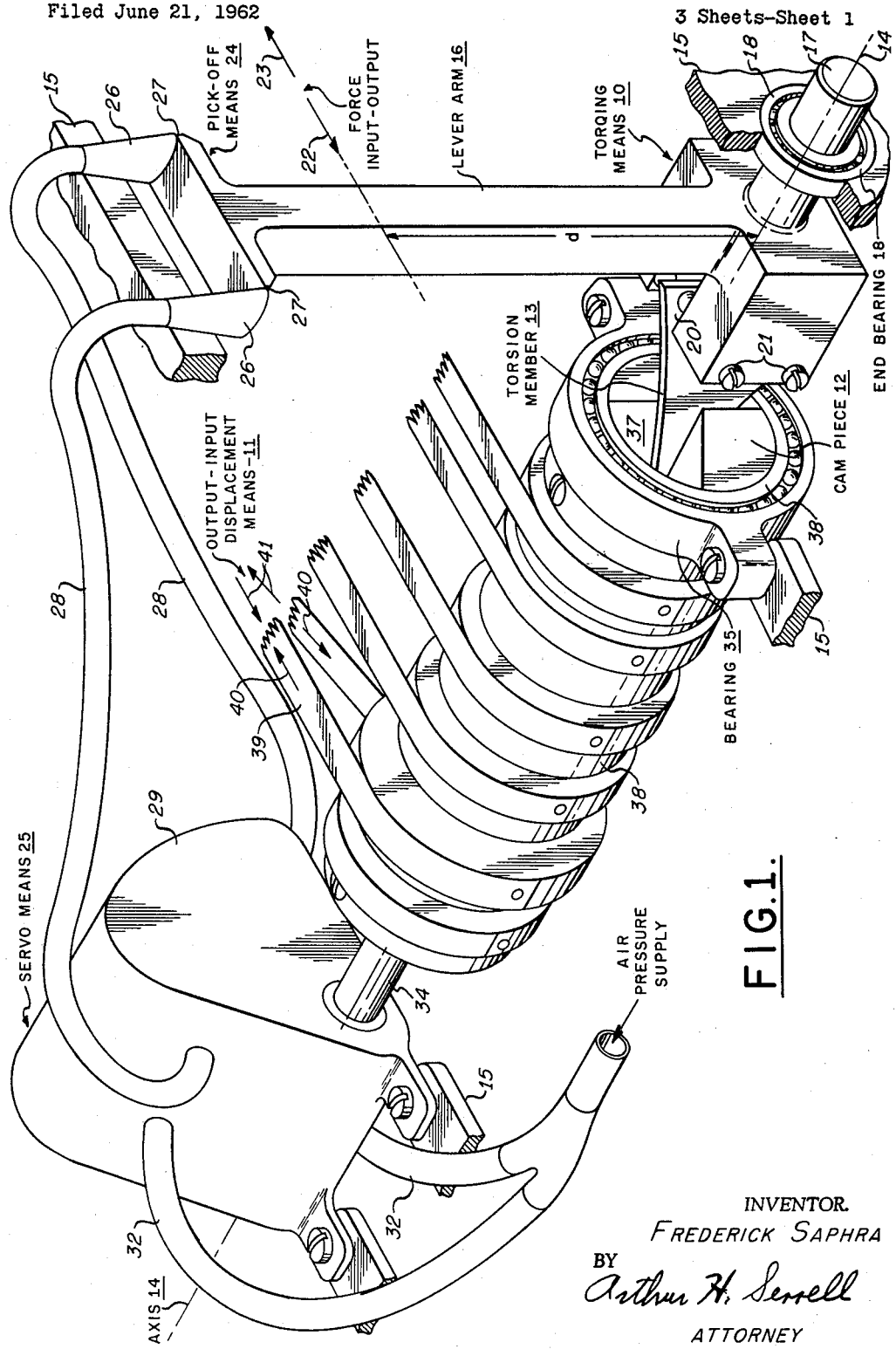

INVENTOR.
FREDERICK SAPHRA
BY
Arthur H. Serrell
ATTORNEY

United States Patent Office 3,166,244
Patented Jan. 19, 1965

3,166,244
REVERSIBLE ANALOG COMPUTERS
Frederick Saphra, Levittown, N.Y., assignor to Sperry Rand Corporation, Great Neck, N.Y., a corporation of Delaware
Filed June 21, 1962, Ser. No. 204,148
13 Claims. (Cl. 235—61)

This invention relates to a computer system of the mechanical self balancing type as utilized with components for exerting an input-output torque about an axis and for providing an output-input displacement. Where the computer includes pick-off means and servo means, the improved system is functional to provide a displacement output of a predetermined mathematical relation to a torque input such as obtained from a gyroscopic apparatus or is reversely suitable to produce an output torque for such apparatus that is related mathematically to a displacement input.

The improved mechanical system includes connected cam piece and torsion member or spring parts that are arranged so that the member is twisted longitudinally about an axis for operation in a torsional characteristic or stiffness range above that of its characteristic or stiffness at a base twist condition. The cooperating faces of the respective twisted spring and cam parts determine the mathematical relation between an analog input and output in accordance with the change in twist slope angle and the effective length of the torsion member or spring with relation to its base twist condition and resultant change in the torsional characteristics of the member in a range that is above that of its characteristic level at the base twist condition. The primary object of the present invention is to provide a system of the type described in which the mathematical relation between its input and output varies in accordance with the torsional characteristics of a twisted member or spring in relation to a base twist condition.

A feature of the invention resides in the provision of a computer system having a connected cam piece and twisted torsion member parts in which the curvature of the cam profile determines the mathematical relation between the input and output.

A further feature of the invention resides in the provision of a computer system in which the twisted member component is a thin flat spring whose lengthwise dimension is greater than its width dimension.

Other objects, features and structural details of the invention will be apparent from the following description when read in relation to the accompanying drawings in which:

FIG. 1 is a perspective view of an assembled computer constructed in accordance with the present invention showing the same incorporated in an input-output system of the character including pick-off means and servo means;

FIG. 2 is a detail perspective view of the servo means of the computer system shown in FIG. 1;

FIG. 3 is a detail perspective view of the tubular member of the system shown in FIG. 1 providing the output-input displacement of the system;

FIG. 8 is a detail view of the cam piece showing the developed profile of the cam face periphery of the computer system in relation to the torque axis and FIG. 9 is a cross sectional view taken on line 9—9, in FIG. 4.

Figure 4:
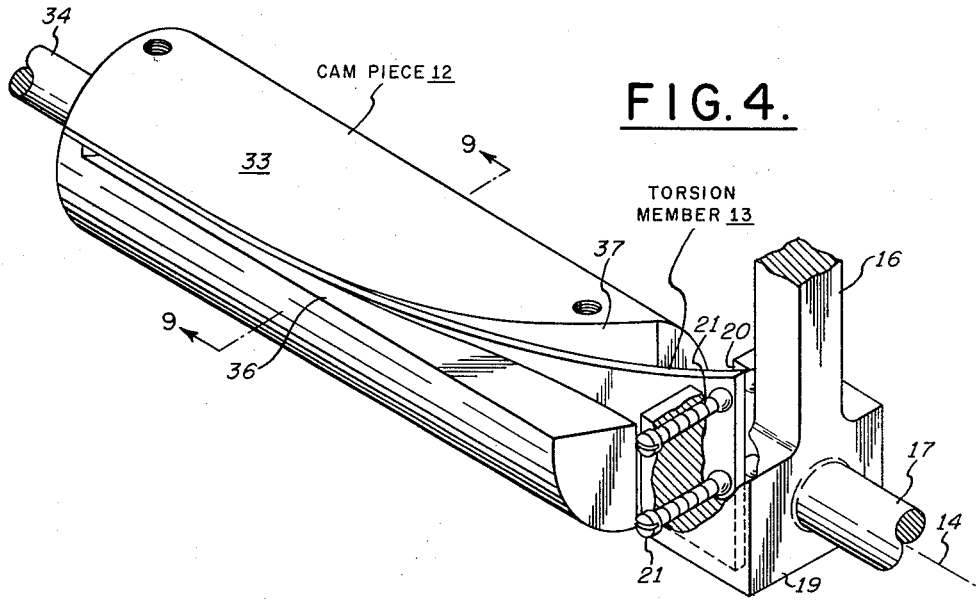
FIG. 4 is a detail perspective view of the connected cam piece and torsion member of the computer system.
Figure 5:
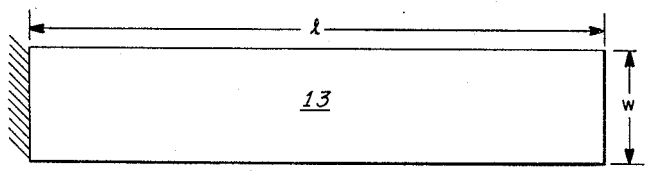
FIG. 5 is a detail side elevation of the torsion member of the system showing the same as a flat spring in untwisted condition.
Figure 6:
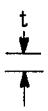
FIG. 6 is a detail elevation at right angles to FIG. 5 showing the uniform thickness of the spring.

As shown in FIGS. 1 and 4 of the drawings, the essential components of the improved computer system include a torquing means 10, output-input displacement means 11, and computing means having connected cam piece 12 and torsion member 13 parts.

The torquing means 10 shown in FIG. 1 exerts an input-output torque about axis 14 depending on an input-output force at a constant lever distance ($d$) from the axis. As represented with respect to a fixed frame 15, the provided lever arm 16 of the arrangement is journalled in an end bearing 18 by a stub shaft 17 fixed to the arm to mount the arm to turn about the torque axis 14. As shown, the axis end of the lever arm 16 includes a mounting block 19 in relation to which one end of the torsion member or flat spring 13 is operatively connected to twist longitudinally about the torque axis. In the type of slide connection shown, the mounting block 19 is provided with an axial slot 20 and four adjustable screw threaded fastenings 21, only two of which are indicated, whose ends are arranged in opposed relation in pairs to engage the respective opposite flat faces of the spring or torsion member 13 at equal radial distances from the axis via a set of balls or cylinders in order to avoid any torsional and axial end restraint on the torsion member. In the self-balancing system shown, any increase in the variable input force represented by input arrow 23 to the torquing means results in displacement of the arm 16 about axis 14 in a clockwise direction as viewed in FIG. 1 and operation of the servo means 25 in a sense that further increases the longitudinal twist of the torsion member 13 in opposition to the input force. In reverse operation, with an input from the displacement means 11 to unbalance the illustrated system, the resulting increase in the torsional characteristic or stiffness of member 13 turns lever arm 16 in a counterclockwise direction as viewed in FIG. 1 to provide a variable output force as represented by arrow 22 resulting in a variable torque output. In both types of operation, the system returns to a balanced torque condition with a null output from the servo means 25.

The computer of the combination shown in FIG. 1 is arranged in the self balancing system with a pick-off means 24 and the servo means 25 for operation with the torsion member or spring 13 twisted so its torsional characteristic or stiffness changes in a range that is above its characteristic level at a base twist condition. The profile of the cam piece 12 together with the described system components connecting the respective input and output means of the improved system provide the means for establishing the base condition of twist of the member 13 as well as its operational range. The base twist condition is established by the dimensions and shear modulus of the spring material, by the slope of the profile of the cam piece and by the initial preload utilized in a given system. The computer does not operate below a required base twist condition and this may vary in degree depending on the requirements of the system.

In the system shown, the pick-off means 24 provides an operating output for the servo means 25 when the lever arm 16 moves about axis 14 due to an increase in the force input 23 of the torquing means 10 or to an increase in the stiffness of member 13 producing an increased torque about axis 14 with a resultant increase in the force output 22. The pick-off means 24 shown in FIG. 1 is pneumatic in character having two spaced air nozzles 26 fixed in relation to the frame 15 that cooperate with the knife edge portions 27 located on the end of the lever arm 16 to vary the respective pressures in the hose connections 28 to the nozzles differentially. The pneumatic servo means 25 shown is responsive to the differential pressure output of the pick-off means 24 when the pressures in the respective hoses 28 are varied by either clockwise or counterclockwise motion of the lever arm 16 about the axis 14. As shown in FIGS. 1 and 2, the provided servo means 25 includes an air tight housing 29 fixed to frame 15 having internal pressure compartments separated by an angularly movable vane 30 connected to a shaft arranged concentrically to the axis 14. Pressure hoses 32 connect the respective compartments of the servo housing 29 to a suitable air pressure supply. One end of each of the pressure hoses 28 to the nozzles 26 is also connected to the respective compartments of the servo housing 29 and the air pressures on the respective opposite sides of the vane 30 are equal until the knife edge portion 27 of the arm 16 moves with respect to the air discharge nozzles 26 to unbalance the system. When the arm 16 moves clockwise as viewed in FIG. 1, the resultant pressure changes in the servo means urges the vane in a counterclockwise direction to restore the system to a balanced condition through the computing means. A vice versa follow-up operation of the servo means results when the initial motion of the arm 16 is in a counterclockwise direction as viewed in FIG. 1.

As shown in FIGS. 1, 4, 5, 6, 7 and 8, the improved computer system includes the cam piece 12 and a combination twisted torsion member or rectangular spring 13 of constant length ($l$) connected to the cam piece to twist longitudinally about the torque axis 14. Twisted member 13 is a flat spring of uniform thickness ($t$) and rectangular transverse cross section whose lengthwise dimension ($l$) is greater than its width dimension ($w$) as clearly shown in FIGS. 5, 6 and 7. The cam piece 12 shown in FIG. 4 is a roller 33 that is supported in concentric relation to the torque axis 14 by a connecting extension 34 of the servo shaft 31 and a bearing 35 mounted on the fixed frame 15. The roller 33 is formed of two parts that connect to engage the end of the longitudinal spring opposite to the end operatively connected to the lever arm 16. Such connection also connects the end of the extending servo shaft 34 to the cam piece 12 so that the servo means influences the twist of the spring and operates in the system as a follow-up to the pick-off means 24 to restore the same to a balanced condition. The joined parts of the roller providing the cam piece 12 include an axial slot 36 with a curved surface providing the profile 37 or cam face of the piece 12.

The cam face or profile 37 is curved on this particular improved computer to cooperate with the conforming face of the spring 13 so that the mathematical relation between the input and output is logarithmic. Accordingly, where the torquing means provides a variable input force as represented by arrow 23 to move arm 16, the servo means operates to move the cam piece 12 through an opposing angular displacement about axis 14 that varies as a logarithmic function of the force input in restoring the system to a balanced condition. The output-input displacement means 11 shown in FIGS. 1 and 3, is provided by a tubular part 38 fitting over the cam piece 12 that journals in the bearing 35 and is suitably fastened to piece 12 to move with it about axis 14 under the influence of the servo means 25. As represented in FIG. 1, tapes 39 connected to part 38 transfer the motion of the piece 12 to suitable utilization apparatus. Arrows 41 on the tapes 39 show the direction of operation of the displacement means 11 in providing an output. The reversed arrows 40 show the direction of operation of the means 11 in providing an input to the cam piece. In the provided computer in reverse operation, the torque output varies as an antilogarithmic function of a logarithmic displacement input. Where neither the servo means 25 nor pick-off means 24 are used, the output force 22 will vary as the antilogarithm of the input displacement 41 if lever arm 16 is not allowed to move. In such a combination, a reversible displacement input operates against a variable torque load.

Figure 7:
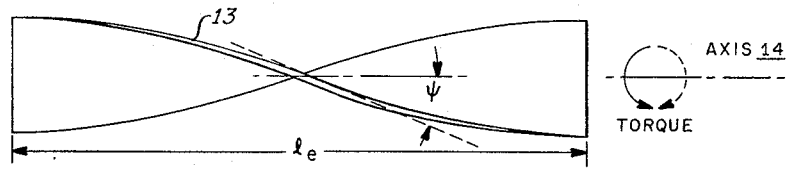
FIG. 7 is a view similar in character to FIG. 5 showing the torsion member or spring in twisted condition.
Figure 8:
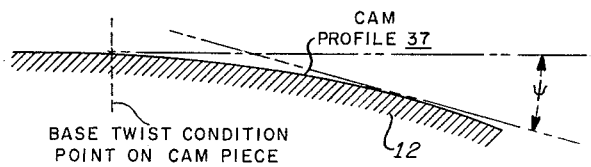

In the operation of the improved computer system, the torsional characteristics of the spring or twisted member 13 is varied to obtain the desired mathematical relation between the input and output by the curvature of the cam profile 37 and face of the twisted spring 13 which conforms to the cam face. As the constant length ($l$) member 13 twists about its axis 14 above the base twist condition point on the cam piece 12 indicated in FIG. 8, the change in the twist slope angle $\psi$ indicated in FIG. 7 and in the effective length ($l_e$) of the member 13 results in the desired change in its torsional characteristics or stiffness as the system operates above its characteristic level at the base twist condition. The relation between twist slope angle $\psi$ at a given constant radius from the axis 14, twist angle $\theta$ and length ($l$) of the spring 13 expressed mathematically as follows:

$$\theta = \int_{l_b}^{l} \psi \, d(l)$$

where the lower limit of the equation represents the spring length ($l_b$) at the point on the cam piece 33 engaged by the spring when twisted in its base characteristic condition. The operative connection between the longitudinal end of the spring 13 and lever arm 16 heretofore described permits the spring to change its effective length ($l_e$) as indicated in FIG. 7 without changing its actual length or relation to either the axis 14 or the arm 16. Accordingly, the cooperating curved faces of the twisted member 13 and cam piece 12 parts of the computing means determine the mathematical relation between the analog input and output of the system.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a computer system of the mechanical self-balancing type, means for exerting an input-output torque about an axis, servo means for providing an output-input angular displacement about the axis, a cam piece with a curved face, and a torsion member of constant length fixedly connected to the cam piece at one end and engaging the face of the piece along its length in longitudinally twisted condition about the torque axis to determine the mathematical relation between the input and output means as the twist slope angle and effective length of the member change in relation to a base twist condition with a resulting change in the torsional characteristic of the member, and means connecting the one end of the member and piece and the other end of the member to the respective servo means and torque means so that the member operates in a range that is above its characteristic level at the base twist condition.

2. A system of the character claimed in claim 1, in which the torsion member is a rectangular spring slideably connected to the torque exerting means at the other of its longitudinal ends to change its effective length.

3. A system of the character claimed in claim 1, in which the torsion member is a spring of uniform thickness.

4. A system of the character claimed in claim 1, in which the torsion member is a longitudinally twisted flat spring and the profile of the cam face is such that the mathematical relation between the input torque means and output servo means is logarithmic, the input variable of the torque means is a force, and the displacement output of the servo means varies as a logarithmic function of the force input.

5. A system of the character claimed in claim 1, in which the torsion member is a longitudinally twisted flat spring and the profile of the cam face is such that the mathematical relation between the input servo means and the output torque means is antilogarithmic, a variable logarithmic input is provided by the displacement servo means, and the output of the torque means varies as an antilogarithmic function of the logarithmic input.

6. A system of the character claimed in claim 1, in which the torsion member is a flat rectangular spring of uniform thickness and rectangular transverse cross section whose lengthwise dimension is greater than its width dimension.

7. A system of the character claimed in claim 1, in which the cam piece is a roller supported in concentric relation to the torque axis having an axial slot with a curved surface providing the cam face.

8. A computer system of the mechanical self-balancing type including means for exerting an input-output torque about an axis having a constant lever arm, pick-off means connected to the arm of the torque exerting means to provide an operating output, output-input servo means operable in accordance with the output of the pick-off to provide an angular displacement about the axis, means operable to null the output of the pick-off to restore the system to a balanced condition including a spring of constant length slideably connected at one end to the arm of the torque exerting means in longitudinally twisted condition about the torque axis, and a cam piece fixedly connected to the other end of the spring with a profile determining the mathematical relation between the torque exerting means and servo means operatively connected to the servo means and engaging the twisted spring to vary its twist slope angle and effective length and thereby change its characteristic in a range above that of its characteristic level at a base twist condition.

9. A system of the character claimed in claim 8, in which the cam profile provides a logarithmic mathematical relation between the torque exerting means and servo means of the system.

10. A system of the character claimed in claim 8, in which the twisted spring is rectangular in configuration with a lengthwise dimension greater than its width dimension.

11. A system of the character claimed in claim 8, in which the cam piece is supported to be angularly displaced about the torque axis depending on the operation of the servo means.

12. In a computer system, means including a lever arm with an axis for exerting an input torque about the axis, means for balancing the input of the torque exerting means including a cam piece with a profile curved along the axis, and a torsion spring of constant length having ends connected between the piece and arm in longitudinally twisted condition and engaged with the profile of the cam piece along its length operable in a range that is above its characteristic level at a base twist condition to provide an equal and opposite output torque about the axis.

13. A system as claimed in claim 12, in which the profile of the cam piece determines the mathematical relation between the input and output torques.

References Cited in the file of this patent

UNITED STATES PATENTS

| 1,391,713 | Bibby | Sept. 27, 1921 |
| 2,238,380 | Almen | Apr. 15, 1941 |
| 2,819,892 | Huff | Jan. 14, 1958 |
| 2,918,214 | Sorteberg | Dec. 22, 1959 |
| 2,983,441 | Galbraith | May 9, 1961 |

FOREIGN PATENTS

| 714,420 | Germany | Dec. 2, 1941 |
| 1,033,462 | Germany | July 3, 1958 |